(12) United States Patent
Starkey, II et al.

(10) Patent No.: US 7,786,054 B2
(45) Date of Patent: Aug. 31, 2010

(54) BIOCIDE FOR WELL STIMULATION AND TREATMENT FLUIDS

(75) Inventors: Ronald Joe Starkey, II, Canton, GA (US); Geoffrey Allen Monteith, Midland, GA (US); Carl Wilhelm Aften, Marietta, GA (US)

(73) Assignee: Kemira Chemicals, Inc., Kennesaw, GA (US)

( * ) Notice: Subject to any disclaimer, the term of this patent is extended or adjusted under 35 U.S.C. 154(b) by 0 days.

(21) Appl. No.: 11/779,509

(22) Filed: Jul. 18, 2007

(65) Prior Publication Data

US 2008/0029266 A1    Feb. 7, 2008

Related U.S. Application Data

(63) Continuation-in-part of application No. 11/497,724, filed on Aug. 2, 2006.

(51) Int. Cl.
*E21B 43/00* (2006.01)
*E21B 33/00* (2006.01)
*C09K 8/68* (2006.01)

(52) U.S. Cl. .................. 507/256; 507/211; 166/266; 166/285

(58) Field of Classification Search .......... 507/256, 507/211; 166/266, 285
See application file for complete search history.

(56) References Cited

U.S. PATENT DOCUMENTS

| | | | |
|---|---|---|---|
| 3,067,095 A | 12/1962 | Baltazzi | |
| 3,377,275 A | 4/1968 | Michalski et al. | |
| 4,414,334 A | 11/1983 | Hitzman | |
| 4,552,591 A | 11/1985 | Millar | |
| 4,975,109 A | 12/1990 | Friedman, Jr. et al. | |
| 5,698,108 A | 12/1997 | Okun | |
| 6,001,158 A | 12/1999 | Elphingstone et al. | |
| 6,127,319 A | 10/2000 | House | |
| 6,322,749 B1 | 11/2001 | McCarthy et al. | |
| 6,613,720 B1 | 9/2003 | Feraud et al. | |
| 6,770,677 B2 | 8/2004 | Carlson et al. | |
| 2003/0156979 A1 | 8/2003 | Carlson et al. | |
| 2004/0102501 A1 | 5/2004 | Lutz et al. | |
| 2004/0120853 A1 | 6/2004 | Carpenter et al. | |
| 2005/0250858 A1 | 11/2005 | Wantling et al. | |

FOREIGN PATENT DOCUMENTS

RU    2 036 216 C1    5/1995

OTHER PUBLICATIONS

International Search Report and the Written Opinion of the International Searching Authority, mailed Jan. 28, 2008, pp. 12.
Internet article entitled "Low-density propping agents improve hydraulic fracturing in the Permian basin" by Randall Edgeman; WorldOil.com, WorldOil Magazine Special Focus, vol. 225, No. 6, Archive date Jun. 2004; 7 pages.
Internet Article entitled "PAN Pesticides Database—Chemicals", Dazomet—Identification, toxicity, use, water pollution potential, ecological toxicity and regulatory information, located at http://www.pesticideinfo.org/Detail_Chemical.jsp? Rec_Id=PC34566, pp. 1-6.
European Patent Office Communication pursuant to Article 94(3) EPC; mail date: Feb. 22, 2010, for application No. 07-836-429.6-211, which claims priority to U.S. Appl. No. 11/779,509; 3 pages.

*Primary Examiner*—Timothy J. Kugel
*Assistant Examiner*—Atnaf Admasu
(74) *Attorney, Agent, or Firm*—Cantor Colburn LLP

(57) ABSTRACT

A well stimulation and or treatment fluid that includes water, other additives, and a biocide consisting of 3,5-dimethyl-1,3,5-thiadiazinane-2-thione in an amount effective to inhibit bacterial growth and minimize antagonistic reactions between the biocide and other additives. Also disclosed are well injection compositions, stimulations, squeezing, waterflood, packing, cement compositions, and methods for cementing.

4 Claims, 6 Drawing Sheets

BIOCIDE FOR WELL STIMULATION AND TREATMENT FLUIDS

CROSS REFERENCE TO RELATED APPLICATIONS

This application is a continuation-in-part application that relates to and claims the benefit of priority to U.S. patent application Ser. No. 11/497,724, filed on Aug. 2, 2006, incorporated herein by reference in its entirety.

BACKGROUND

The present disclosure generally relates to biocides, and more particularly, to the use of 3,5-dimethyl-1,3,5-thiadiazinane-2-thione (Thione) in gas and oil field well stimulation and treatment fluids. The disclosure relates to various forms of Thione including, but not limited to, non-emulsified -3,5-dimethyl-1,3,5-thiadiazinane-2-thione (CB Thione), an emulsified 3,5-dimethyl-1,3,5-thiadiazinane-2-thione(WB Thione), and a dry 3,5-dimethyl-1,3,5-thiadiazinane-2-thione.

After a well is drilled into a subterranean geological formation that contains oil, natural gas, and water, every effort is made to maximize the production of the oil and/or gas. To increase the permeability and flow of the oil and/or gas to the surface, the drilled wells are often subjected to well stimulation. Well stimulation generally refers to several post drilling processes used to clean the wellbore, enlarge channels, and increase pore space in the interval to be injected thus making it possible for fluids to move more readily into the formation. In addition, typical reservoir enhancement processes such as waterflood need to utilize biocide as part of the waterflood package.

A typical well or field treatment process generally includes pumping specially engineered fluids at high pressure and rate into the subterranean geological formation. The high-pressure fluid (usually water with some specialty high viscosity fluid additives) exceeds the rock strength and opens a fracture in the formation, which can extend out into the geological formation for as much as several hundred feet. Certain commonly used fracturing treatments generally comprise a carrier fluid (usually water or brine) and a polymer, which is also commonly referred to as a friction reducer. Many well stimulation fluids will further comprise a proppant. Other compositions used as fracturing fluids include water with additives, viscoelastic surfactant gels, gelled oils, crosslinkers, oxygen scavengers, and the like.

The well treatment fluid can be prepared by blending the polymer with an aqueous solution (sometimes all oil-based or a multi-phase fluid is desirable); often, the polymer is a solvatable polysaccharide. The purpose of the polymer is generally to increase the viscosity of the fracturing fluid that aids in the creation of a fracture; and to thicken the aqueous solution so that solid particles of proppant can be suspended in the solution for delivery into the fracture.

The polymers used in well treatment fluids are subjected to an environment conductive to bacterial growth and oxidative degradation. The growth of the bacteria on polymers used in such fluids can materially alter the physical characteristics of the fluids. For example, bacterial action can degrade the polymer, leading to loss of viscosity and subsequent ineffectiveness of the fluids. Fluids that are especially susceptible to bacterial degradation are those that contain polysaccharide and/or synthetic polymers such as polyacrylamides, polyglycosans, carboxyalkyl ethers, and the like. In addition to bacterial degradation, these polymers are susceptible to oxidative degradation in the presence of free oxygen. The degradation can be directly caused by free oxygen or mediated by aerobic microorganisms. Thus, for example, polyacrylamides are known to degrade to smaller molecular fragments in the presence of free oxygen. Because of this, biocides and oxygen scavengers are frequently added to the well treatment fluid to control bacterial growth and oxygen degradation, respectively. Desirably the biocide is selected to have minimal or no interaction with any of the components in the well stimulation fluid. For example, the biocide should not affect fluid viscosity to any significant extent and should not affect the performance of oxygen scavengers contained within the fluid. The oxygen scavengers are generally derived from bisulfite salts.

Other desirable properties for the biocide are (a) cost effectiveness, e.g., cost per liter, cost per square meter treated, and cost per year; (b) safety, e.g., personnel risk assessment (for instance, toxic gases or physical contact), neutralization requirements, registration, discharge to environment, and persistence; (c) compatibility with system fluids, e.g., solubility, partition coefficient, pH, presence of hydrogen sulfide, temperature, hardness, presence of metal ions or sulfates, level of total dissolved solids; (d) compatibility with other treatment chemicals e.g., corrosion inhibitors, scale inhibitors, demulsifiers, water clarifiers, well stimulation chemicals, and polymers; and (e) handling, e.g., corrosiveness to metals and elastomers, freeze point, thermal stability, and separation of components.

Current well stimulation fluids generally employ either glutaraldehyde (Glut) or tetra-kis-hydroxymethyly-phosphonium sulfate (THPS) to control bacterial contamination. Glutaraldehyde can be problematic because it is hazardous to handle and has environmental concerns. Moreover, it has been observed that Glut can deleteriously affect the fluid viscosity of the well treatment fluid at elevated temperatures; temperatures that are commonly observed during use of the well treatment fluid. This can be problematic in fracturing applications since the higher maintained fluid viscosity down hole could hinder flow back. In addition, Glut has been shown to negatively impact the behavior of the oxygen scavenger.

With regard to THPS, although it has been shown to perform better than Glut with respect to interaction with the oxygen scavengers, THPS has been found to interact with the polymer and limit viscosity development when added pre-inversion and post-inversion. That is, THPS has been observed to interact with the polymer during shear and significantly reduce fluid viscosity.

Thus, there remains a need for a more versatile biocide for use in well stimulation fluids that can effectively control bacterial contamination and have minimal interaction with the polymer and/or oxygen scavenger.

BRIEF SUMMARY

Well injection compositions and methods of using such compositions are also disclosed. In one embodiment, a well injection composition comprises: an injection fluid for removing a production fluid from a subterranean formation; and a biocide comprising 3,5- dimethyl-1,3,5-thiadiazinane-2-thione in an amount effective to inhibit bacterial growth. In an embodiment, a method of recovering a production fluid from a subterranean formation comprises: displacing a well injection composition through a wellbore down to the subterranean formation to force the production fluid from the subterranean formation, the well injection composition comprising an injection fluid and a biocide comprising 3,5-dimethyl-1,3,5-thiadiazinane-2-thione in an amount effective to inhibit bacterial growth.

Cement compositions and methods of using such compositions are further disclosed. In one embodiment, a cement composition comprises: a cement; and a biocide comprising 3,5-dimethyl-1,3,5-thiadiazinane-2-thione in an amount effective to inhibit bacterial growth. In another embodiment, a method of cementing comprises: injecting a cement composition into a permeable zone of a wellbore, the cement composition comprising a cement and a biocide comprising 3,5-dimethyl-1,3,5-thiadiazinane-2-thione in an amount effective to inhibit bacterial growth; and allowing the cement composition to set.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Figure 1:
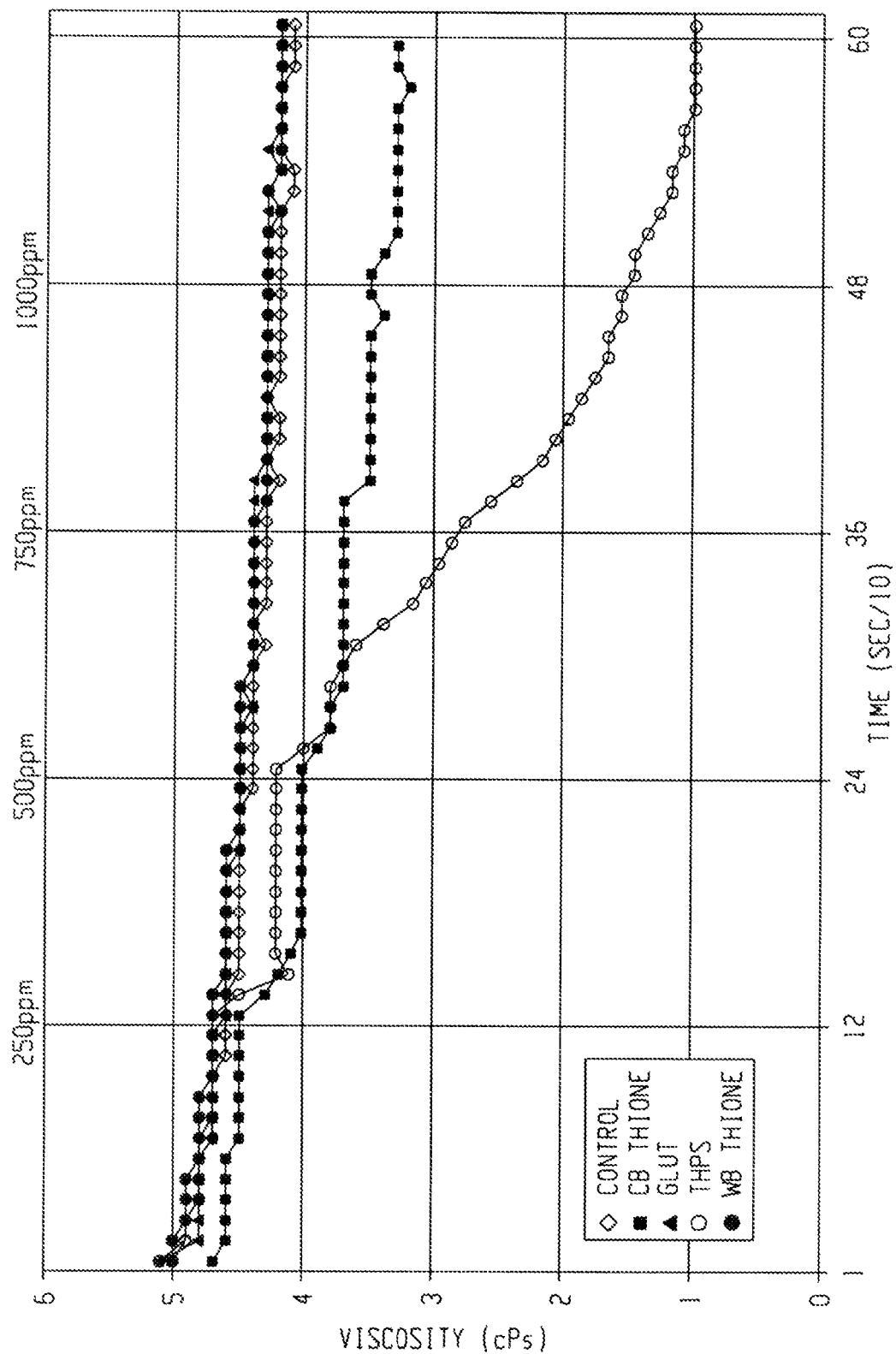
FIG. 1 graphically illustrates post inversion viscosity in centipoise (cPs) as a function of time for polymer fluid samples containing varying amounts of biocide relative to a control not containing the biocide.

The present disclosure is generally directed to the use of 3,5-dimethyl-1,3,5-thiadiazinane-2-thione (also commonly referred to as "Thione") as a biocide in gas and oil well stimulations. Surprisingly, relative to popular biocides currently used in well stimulation fluids, 3,5-dimethyl-1,3,5-thiadiazinane-2-thione is much more versatile and provides a reduced interference with friction reducers in the well stimulation fluid, a reduced interference with oxygen scavengers, and has minimal interaction with friction reducers at elevated temperatures relative to conventional biocides such as Glut or THPS. The 3,5-dimethyl-1,3,5-thiadiazinane-2-thione biocide can be used in an aqueous solution (CB Thione) or can be added to the well treatment fluid as an emulsified fluid (WB Thione) or as a dry product.

The amount of 3,5-dimethyl-1,3,5-thiadiazinane-2-thione in the well stimulation fluid will vary, generally depending on the polymer employed, the conditions of the water and the extent of prior bacterial manifestation, the time period of bacterial growth, the general environment where the biocide will be used, and the like. Thus, it is not possible to delineate a minimal amount, however, one skilled in the art will be able to determine the minimal amount with undue experimentation. There is no maximum amount, although large excesses may not be desirable for economic reasons.

The well treatment fluid generally comprises at least one polymer. Preferred classes of polymers are polysaccharides or synthesized polymers. Suitable polymers include, but are not intended to be limited to, galactomannan polymers and derivatized galactomannan polymers; starch; xanthan gums; hydroxycelluloses; hydroxyalkyl celluloses; polyvinyl alcohol polymers (such as homopolymers of vinyl alcohol and copolymers of vinyl alcohol and vinyl acetate): and polymers (such as homopolymers, copolymers, and terpolymers) that are the product of a polymerization reaction comprising one or more monomers selected from the group consisting of vinyl pyrrolidone, 2-acrylamido-2-methylpropanesulfonic acid, acrylic acid and acrylamide, methacrylic acid, styrene sulfonic acid, acrylamide and other monomers currently used for oil well treatment polymers, among others. Certain polyvinyl alcohol polymers can be prepared by hydrolyzing vinyl acetate polymers. Preferably the polymer is water-soluble. Specific examples of polymers that can be used include, but are not intended to be limited to hydrolyzed polyacrylamide, guar gum, hydroxypropyl guar gum, carboxymethyl guar gum, carboxymethylhydroxypropyl guar gum, hydroxyethyl cellulose, carboxymethylhydroxyethyl cellulose, hydroxypropyl cellulose, copolymers of acrylic acid and acrylamide, xanthan, starches, and mixtures thereof, among others.

The 3,5-dimethyl-1,3,5-thiadiazinane-2-thione can be added directly as an emulsification, solid, or solution to the fluid used to make the well stimulation fluid, to a concentrated polymer solution, and/or may be made on a slug dose basis. The present disclosure is not intended to be limited to a particular method for making the well stimulation fluid.

Examples of bacteria to which the 3,5-dimethyl-1,3,5-thiadiazinane-2-thione is effective and are commonly found in oil and gas field fluids and waters include, but are not intended to be limited to, aerobic, anaerobic, and facultative bacteria, sulfur reducing bacteria, acid producing bacteria, and the like. Specific examples include, but are not limited to, pseudomonad species, bacillus species, enterobacter species, serratia species, clostridia species, and the like. It should be noted that it is expected that the use of 3,5-dimethyl-1,3,5-thiadiazinane-2-thione in the well stimulation fluid will be effective to inhibit algae and fungi formation at the same biocidal concentrations for bacterial effectiveness.

Well stimulation and completion (treatment) fluid compositions of the present disclosure can further comprise other additives. Additives are generally included to enhance the stability of the fluid composition itself to prevent breakdown caused by exposure to oxygen, temperature change, trace metals, constituents of water added to the fluid composition, and to prevent non-optimal crosslinking reaction kinetics. The choice of components used in fluid compositions is dictated to a large extent by the properties of the hydrocarbon-bearing formation on which they are to be used. Such additives can be selected from the group consisting of water, oils, salts (including organic salts), crosslinkers, polymers, biocides, corrosion inhibitors and dissolvers, pH modifiers (e.g., acids and bases), breakers, metal chelators, metal complexors, antioxidants, wetting agents, polymer stabilizers, clay stabilizers, scale inhibitors and dissolvers, wax inhibitors and dissolvers, asphaltene precipitation inhibitors, water flow inhibitors, fluid loss additives, chemical grouts, diverters, sand consolidation chemicals, proppants, permeability modifiers, viscoelastic fluids, gases (e.g., nitrogen and carbon dioxide), and foaming agents.

For well stimulation, the fluid containing the 3,5-dimethyl-1,3,5-thiadiazinane-2-thione biocide can be injected directly into the wellbore to react with and/or dissolve substances affecting permeability; injected into the wellbore and into the formation to react with and/or dissolve small portions of the formation to create alternative flowpaths; or injected into the wellbore and into the formation at pressures effective to fracture the formation.

In an additional embodiment, the 3,5-dimethyl-1,3,5-thiadiazinane-2-thione can be employed as a biocide in a well injection composition. The well injection composition can comprise an injection fluid for removing a production fluid such as oil from a subterranean formation and a biocide comprising 3,5-dimethyl-1,3,5-thiadiazinane-2-thione in an amount effective to inhibit bacterial growth. The injection fluid can be any fluid suitable for forcing the production fluid out of the subterranean formation and into a production wellbore where it can be recovered. For example, the injection fluid can comprise an aqueous fluid such as fresh water or salt water (i.e., water containing one or more salts dissolved therein), e.g., brine (i.e., saturated salt water) or seawater. The biocide described previously in relation to well stimulation fluids is appropriate for this application as well.

The foregoing well injection composition can be used in a flooding operation (e.g., secondary flooding as opposed to a primary recovery operation which relies on natural forces to move the fluid) to recover a production fluid, e.g., oil, from a subterranean formation. The flooding operation entails displacing the well injection composition through an injection well (or wells) down to the subterranean formation to force or drive the production fluid from the subterranean formation to a production well (or wells). The flooding can be repeated to increase the amount of production fluid recovered from the reservoir. In subsequent flooding operations, the injection fluid can be replaced with a fluid that is miscible or partially miscible with the oil being recovered.

The injection well can include a cement sheath or column arranged in the annulus of a wellbore, wherein the annulus is disposed between the wall of the wellbore and a conduit such as a casing running through the wellbore. Thus, the well injection composition can pass down through the casing into the subterranean formation during flooding. The biocide present in the well injection composition can serve to reduce bacterial growth on the cement sheath and the conduit therein without significantly affecting the materials with which it comes in contact, including the components of the well injection composition.

In yet another embodiment, the 3,5-dimethyl-1,3,5-thiadiazinane-2-thione can be employed as a biocide in a cement composition, particularly a cement composition used for squeeze cementing. The cement composition can comprise a cement and a biocide comprising 3,5-dimethyl-1,3,5-thiadiazinane-2-thione in an amount effective to inhibit bacterial growth. The cement can be, for example, a hydraulic cement, which comprises calcium, aluminum, silicon, oxygen, and/or sulfur, and which sets and hardens by reaction with water. Examples of suitable hydraulic cements include but are not limited to Portland cements, pozzolana cements, gypsum cements, high alumina content cements, silica cements, high alkalinity cements, and combinations comprising at least one of the foregoing cements. More specific examples of cements are class A, C, G, and H Portland cements. The cement composition can be stored in dry form until it is desired to place it in a wellbore, making the cement composition particularly useful in sub-zero condition. The cement composition can be combined with a fluid for rendering it flowable when it is desired to pump it into a wellbore. The fluid can comprise, for example, fresh water, salt water such as brine or seawater, or a combination comprising at least one of the foregoing types of water.

As deemed appropriate by one skilled in the art, additional additives may be included in the cement composition for improving or changing its properties. Examples of such additives include but are not limited to set retarders, fluid loss control additives, defoamers, dispersing agents, set accelerators, and formation conditioning agents. The additives can be pre-blended with the dry cement composition before the addition of a fluid thereto. Alternatively, the additives can be introduced to the cement composition concurrent with or after the addition of a fluid thereto.

The foregoing cement composition can be utilized in a remedial cementing operation such as squeeze cementing, which is performed after the primary cementing operation. In squeeze cementing, the cement composition can be combined with an aqueous solution and then forced under pressure into permeable zones through which fluid can undesirably migrate in the wellbore. Examples of such permeable zones include fissures, cracks, fractures, streaks, flow channels, voids, high permeability streaks, annular voids, and so forth. A permeable zone can be present in the cement sheath residing in the annulus of the wellbore, in the wall of the conduit inside the cement sheath, and/or in a microannulus between the cement sheath and the conduit. The transition time of the cement composition can be relatively short such that the amount of gas migration into the composition is limited. The cement composition is allowed to set within the permeable zone to form an impermeable mass that plugs the zone and prevents fluid from leaking therethrough. The biocide present in the cement composition can serve to inhibit microbiological induced corrosion of the cement sheath and the conduit therein without significantly affecting the materials with which it comes in contact, including the components of the cement composition. That is, the biocide can attack bacteria present on the cement sheath and the conduit to reduce the growth of the bacteria.

EXAMPLES

In the following examples, an in-house constructed Inversion Loop was modified with a Grace M3500 viscometer for periodically measuring fluid viscosity as a function of time. The ORP apparatus included a HACH sensION pH meter with a combination ORP electrode. In Example 7, a friction loop apparatus was employed Example 1

In this example, the post inversion viscosity of a polymeric fluid having a biocide at different concentrations was analyzed relative to a control that did not include a biocide. The biocides analyzed included 50% Glut, 35% THPS, 24% caustic based Thione (CB Thione), and a 20% water based Thione (WB Thione). A 0.1% aqueous stock solution of polyacrylide-co-aciylic acid, Aas made and allowed to age for about 30 minutes. For each of the samples tested, 1,500 grams of the stock solution was first added to the inversion loop, recirculated, and the viscosity measured. After 2 minutes, the biocide was added at an initial concentration of 250 parts per million (ppm) and allowed to recirculate for 2 minutes at which time the viscosity was recorded. Additional 250 ppm increments of the biocide were added and the viscosities measured after recirculation in the inversion loop for an additional 2 minutes.

The test results are graphically illustrated in FIG. 1. As shown, polymer shear is observed as a function of recirculation in the Inversion Loop apparatus (see control). For post inversion, both Glut and WB Thione exhibited minimal effect on viscosity, even at the higher concentrations. CB Thione, exhibited a slight reduction in polymer viscosity as a function of increasing concentration whereas a significant viscosity reduction was observed with THPS.

Example 2

Figure 2:
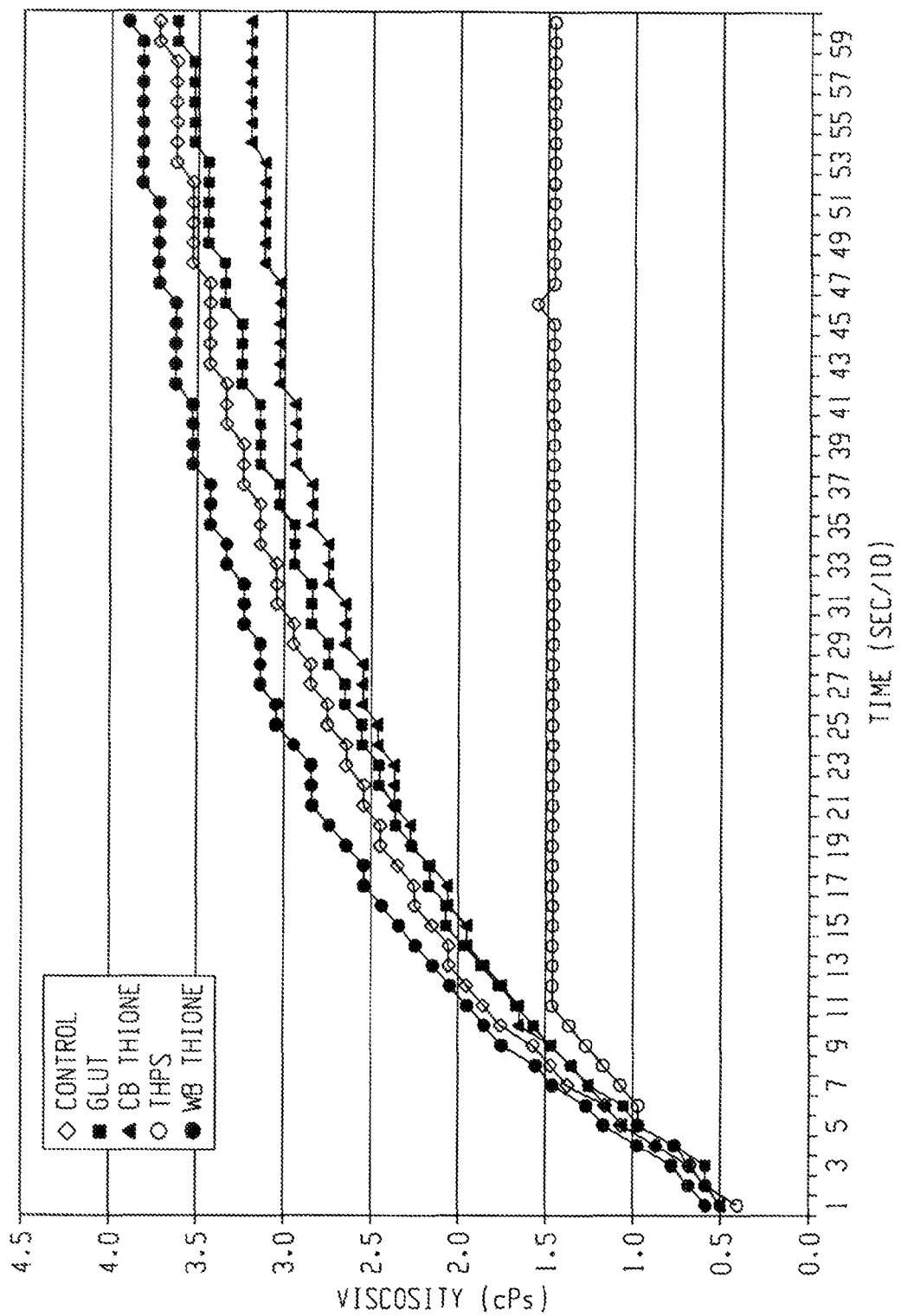
FIG. 2 graphically illustrates pre-inversion viscosity as a function of time for polymer fluid samples containing 500 parts per million of biocide relative to a control not containing the biocide.
Figure 3:
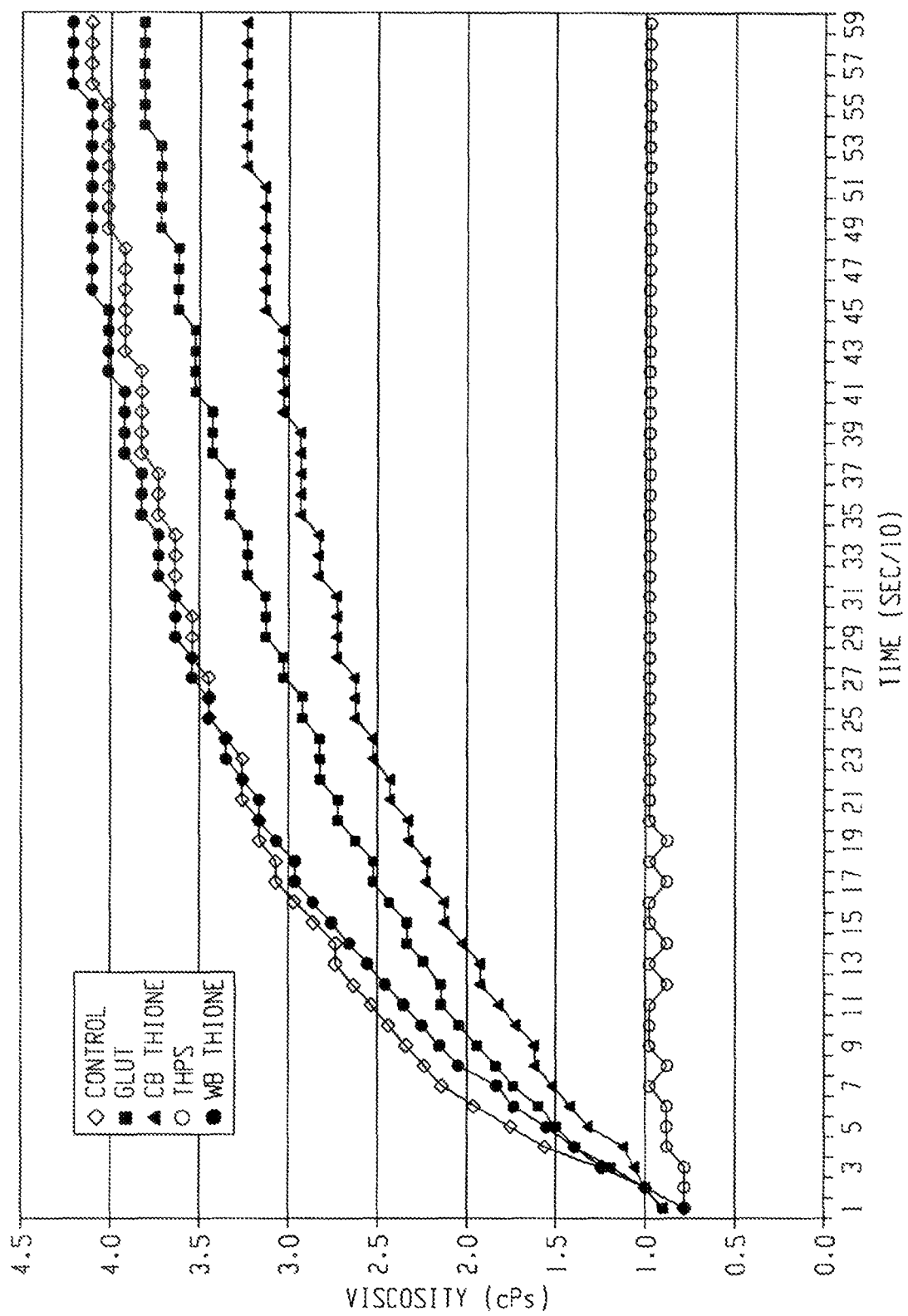
FIG. 3 graphically illustrates pre-inversion viscosity as a function of time for polymer fluid samples containing 1,000 parts per million of biocide relative to a control not containing the biocide.

In this example, pre-inversion viscosity was measured for the various biocide/polymer fluids and control of Example 1, which were prepared in accordance with Example 1. In those samples containing the biocide, the biocide concentrations examined were 500 ppm and 1,000 ppm. The results are shown in FIGS. 2 and 3, respectively.

The results clearly show that THPS interacts with the polymer resulting in a significant decrease in viscosity. In contrasts the Glut and the samples containing CB Thione and WB Thione showed minimal interaction relative to the control sample. Interestingly, the WB Thione exhibited an increase in viscosity relative to the control. While not wanting to be bound by theory, the components used to form the emulsion are believed to react with or interact with the polymer.

Example 3

Figure 4:
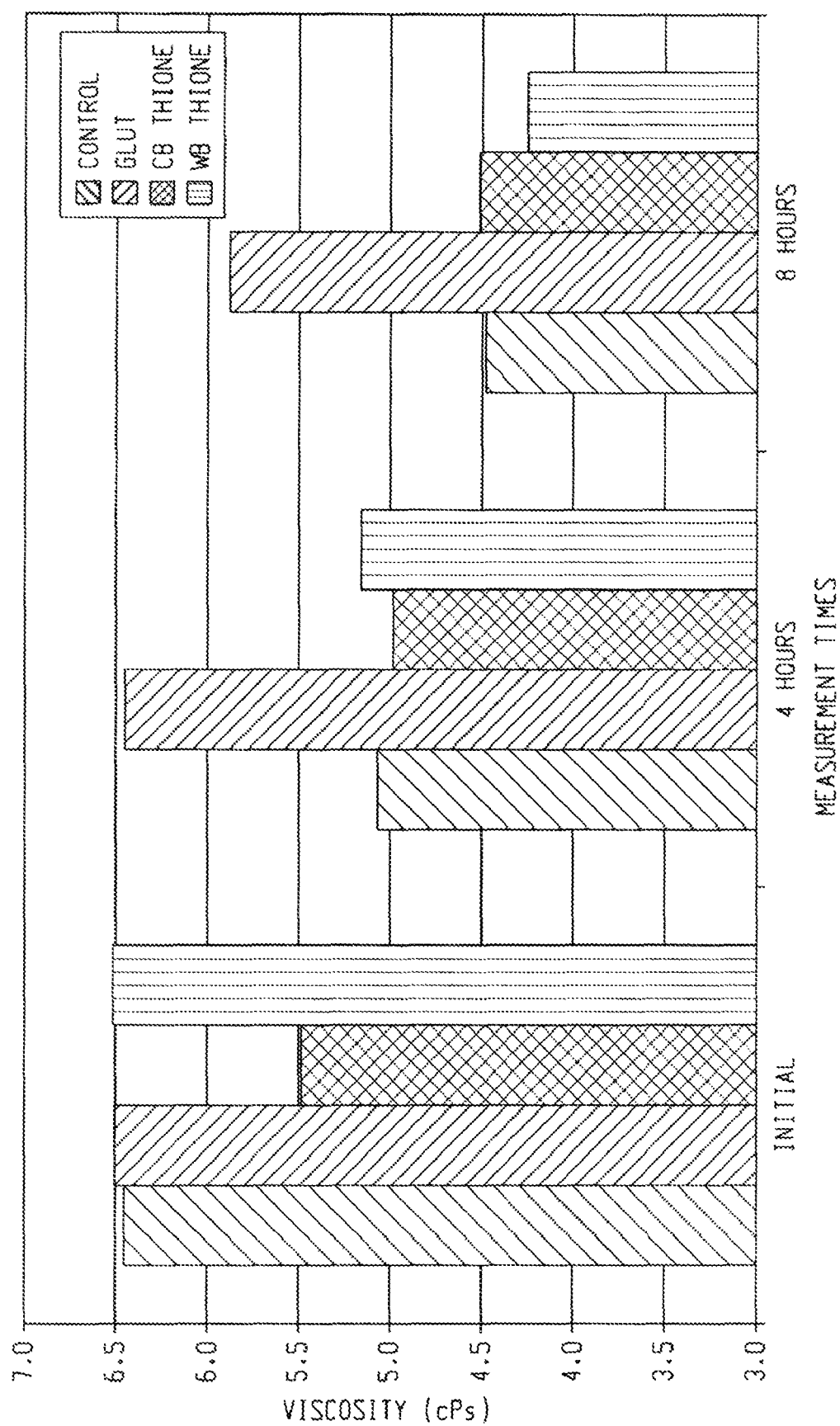
FIG. 4 graphically illustrates a bar graph of post inversion viscosity as a function of time for polymer fluid samples heated at a temperature of 180° F. for defined period of times containing 500 parts per million of biocide relative to a control not containing the biocide.

In this example, the effect of heat on the biocide/polymer fluids and control of Example 1 was analyzed. THPS was not analyzed because of its observed interaction at room temperature in the earlier examples. For each of the samples that were tested, 500 ppm of the biocide was added to 1,000 grams of the polyacrylamide stock solution of Example 1. The samples were added to the inversion loop, recirculated for 1 minute, and the viscosity measured. The samples were then placed into an oven at 180° F. for 4 hours, and were allowed to cool to room temperature (77° F.). Once the samples were at room temperature, the viscosity was measured and then return to the oven for an additional 4 hours at which the time sample was cooled to room temperature and the viscosity measured. The results are shown in FIG. 4.

From the results above, it can be noted that polymer viscosity degrades with heat over time. For each test, the initial viscosity measurement shows only the effect of the biocide on the polymer viscosity. CB Thione is the only one to give a significant reduction from that of the control after the first heating cycle, which was expected given the results seen in the previous post-inversion viscosity testing. After four hours at temperature, however, the viscosities of the control, CB Thione, and WB Thione are essentially the same, while the viscosity of the Glut test sample has maintained nearly all its viscosity. This same effect is seen at the eight-hour mark, with the Glut sample showing only slightly reduced viscosity. While not wanting to be bound by theory it is believed that the glutaraldehyde slightly crosslinked the polymer at elevated temperature, thus allowing the polymer viscosity to persist above that of the polymer alone. Reactions between dialdehyde and acrylamide are quite well documented. This effect could be considered problematic in fracturing applications since the higher maintained viscosity down hole could potentially hinder flow back.

Example 4

Figure 5:
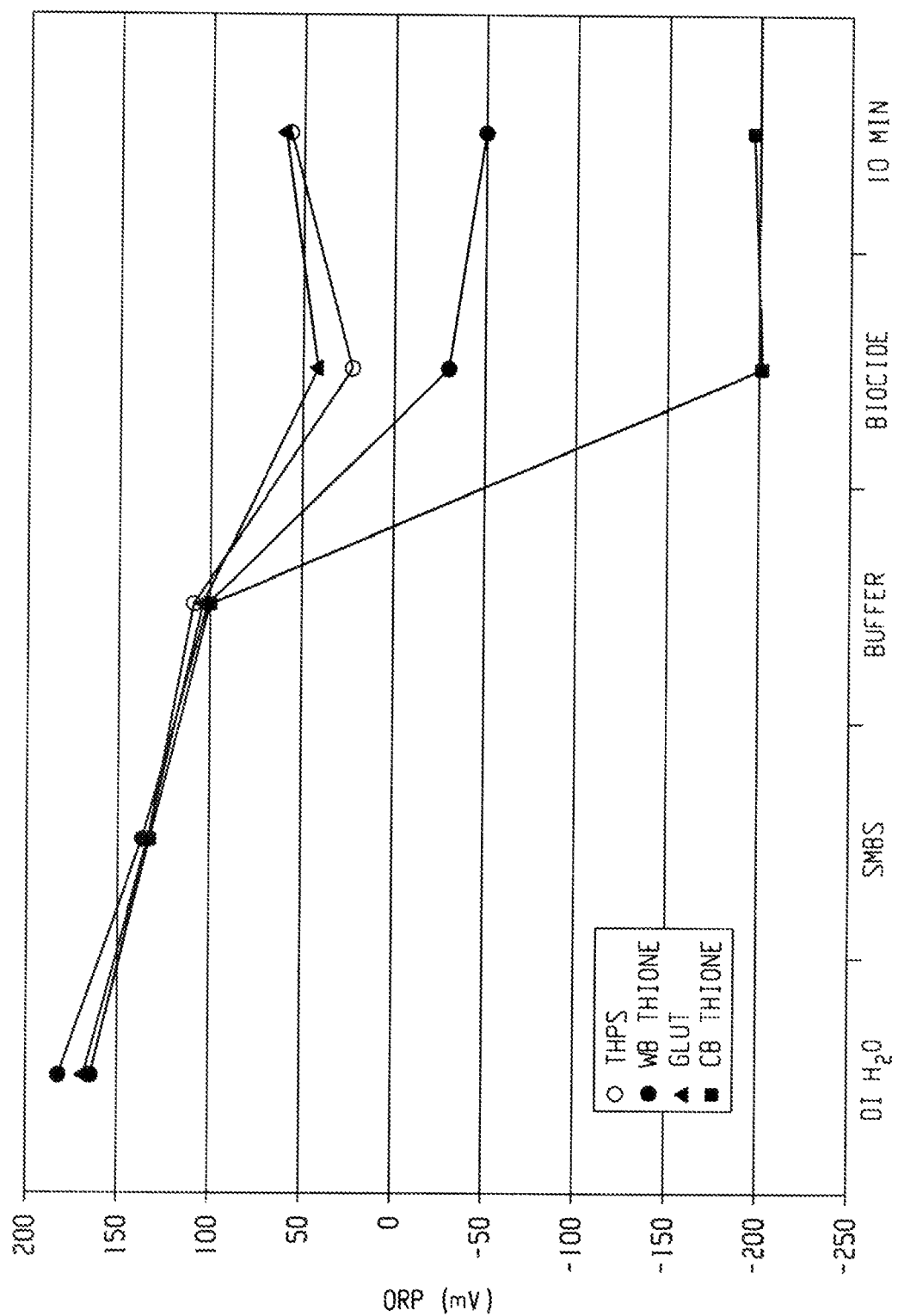
FIG. 5 graphically illustrates oxygen reduction potential in millivolts for polymer samples containing 120 parts per million of sodium metabisulfite buffered to a pH of 6.4 and having 500 parts per million of biocide.

In this example, the effect of CB Thione, WB Thione. THPS and Glut on the oxygen scavenger was examined. To a beaker containing 500 milliliters of deionized water, a 120 ppm dose of sodium metabisulfite (SMBS) was added and the pH and oxygen reduction potential (ORP) were recorded. Once stabilized, phosphate buffer was added to increase the pH to 6.4 and the ORP recorded. Finally, the particular biocide tested was added at a concentration of 500 ppm. The ORP was recorded initially and after a period of 10 minutes. The results are shown in FIG. 5.

From these results, it can be noted that there is a significant difference in ORP response upon addition of each respective biocide. ORP is an indication of a solution's ability to oxidize or reduce another solution/species. Theoretically, the lower the ORP, the higher the ratio of reduced species to oxidized species. Glut does not significantly impact ORP upon initial addition, and after 10 minutes of residence time the ORP actually increases nearly to the level of the DI $H_2O$ alone. This would indicate a negative impact on the bisulfite scavenger. The reactions between aldehydes and bisulfite are well documented and are often used for melting point determinations. Similar results were observed with THPS. In contrast, upon addition of the CB Thione, the ORP of the solution is lowered significantly. The lower value given by the CB Thione solution would indicate a more preferable environment for $O_2$ scavenging to occur. WB Thione also indicated a more preferable environment for $O_2$ scavenging.

Example 5

In this example, a friction loop apparatus was employed to assess the compatibility of biocide formulations with an anionic friction reducer. The biocides analyzed included 50% Glut, 35% THPS, 24% caustic based Thione (CB Thione), and a 20% water based Thione (WB Thione).

A commercial anionic friction reducing polymer was dosed at 0.5 gallons per thousand gallons of water. The friction loop determined the effect of the polymer on the differential pressure across a 5 foot test section of 0.5" nominal stainless steel pipe. The friction loop was operated at a flow rate of 24 gallons per minute, a temperature of about 85° Fahrenheit, and a Reynolds number of about 120,000. Differential pressure was continually measured across the test section at one-second intervals for a period of 10 minutes. The first minute of the test was used to establish a baseline pressure drop. The friction reducer was injected into the system 1:00 minute after the test was started. The respective biocides were injected into the system at a 100 ppm dosage 3:00 minutes into the test, and an additional 500 ppm dosage was injected 5:00 minutes into the test.

The pressure drop data was used to calculate a percent friction reduction in accordance with equation (1) below, $$\% \ FR = \frac{\Delta P_{solvent} - \Delta P_{solution}}{\Delta P_{solvent}}, \quad (1)$$

wherein % FR is the percent friction reduction, $\Delta P_{solvent}$ is the pressure drop across the test section for pure solvent (water), and $\Delta P_{solution}$ is the pressure drop across the test section for the solution of water, friction reducer, and biocide. The results are shown in FIG. 6.

Figure 6:
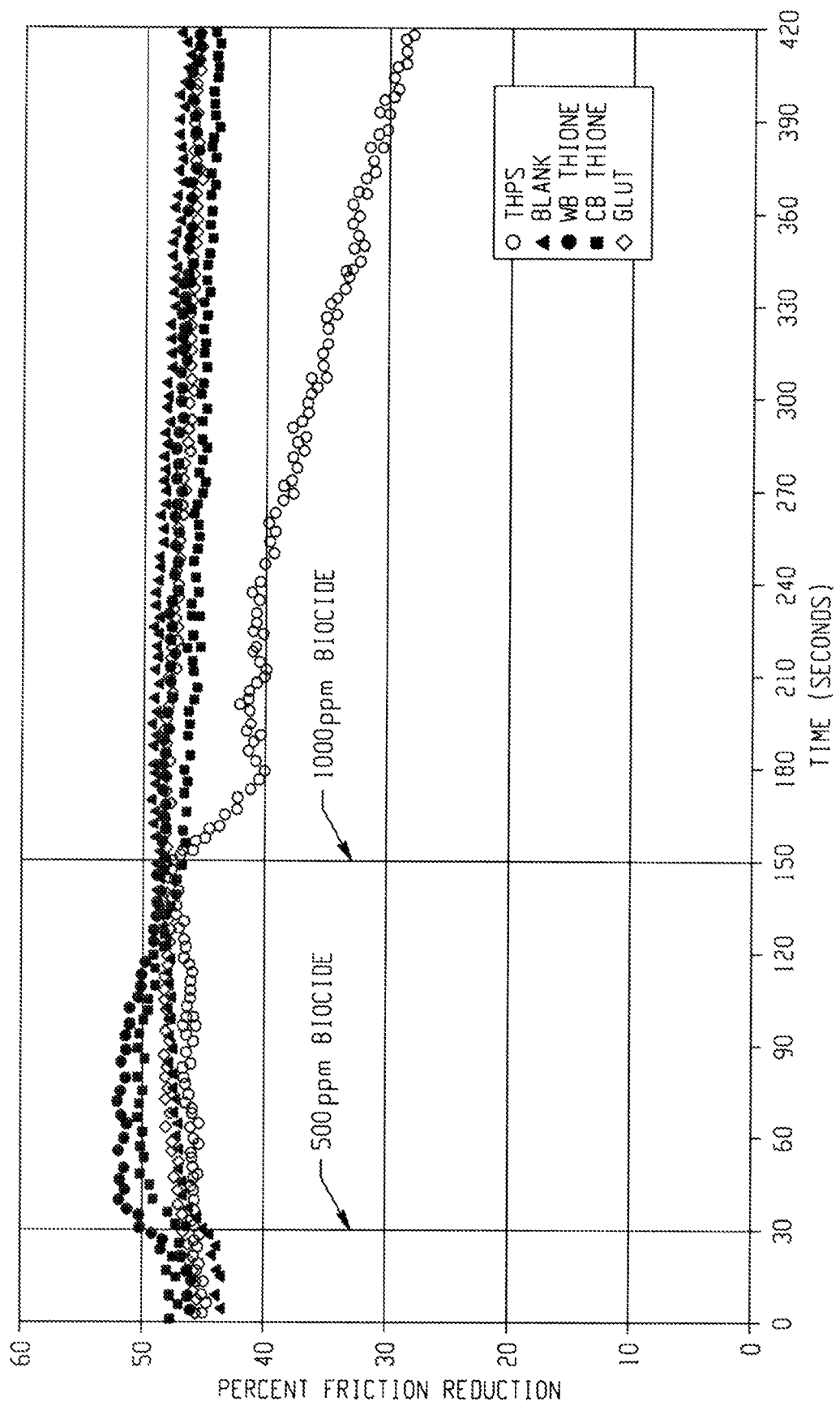
FIG. 6 graphically illustrates percent friction reduction as a function of time for various biocides including 3,5-dimethyl-1,3,5-thiadiazinane-2-thione in a friction loop apparatus.

In FIG. 6, a control was included where no biocide was injected into the system. In samples where biocide was added, the biocide injection points are represented by vertical lines at 30 seconds and 150 seconds, which correspond to times of 3:00 minutes and 5:00 minutes after the initiation of the test. As shown in FIG. 6 the % FR data from 0 to 30 seconds represent the friction reduction performance of the pure polymer solution, which increases slightly with time due to continued inversion in the loop.

The introduction of 500 ppm of each respective biocide sample had no negative effect on the performance of the friction reducer. As shown in FIG. 6, after slight differences in inversion from 30 to 90 seconds, the results of each experiment appear nearly identical from 90 seconds to 120 seconds.

Additional biocide was introduced to bring the total biocide loading level to 1000 ppm. The % FR results for WB Thione did not significantly deviate from the performance of the control sample during the 150 to 420 second time interval. Similarly, the % FR for Glut remained even with that of the blank sample over the same time interval. These data indicate that WB Thione and Glut do not have an adverse impact on friction reducer performance at this dosage range (1000 ppm).

The performance of the friction reducer in the presence of CB Thione declines relative to the performance of the blank from 150 to 420 seconds. This effect is verified by comparing the % FR data through the last 10 seconds of the test. These data indicate a % FR of 46.7% for the control sample and 43.5% for the CB Thione, respectively.

However, the introduction of the THPS biocide sample resulted in severe performance degradation of the friction reducer. After an initial drop in % FR, the friction reduction performance plateaus, then continues to drop with increasing time. The final % FR results were 46.7% for the control sample, and 27.8% for the THPS sample. The results showed that the WB Thione and Glut had no effect on the performance of the polymer at the prescribed dosage amount. It was also shown that CB Thione had a relatively minor detrimental effect on polymer performance when dosed at 1,000 ppm, causing a 3.2% drop in absolute friction reduction. THPS caused a 19.9% decline in absolute friction reduction at a 1,000 ppm dosage, which eliminated over 40% of the original friction reduction capacity of the polymer.

Example 6

In this example, the biocidal effectiveness on sulfate reducing bacteria (SRB) and acid producing bacteria (AB) for biocide formulations containing CB Thione and WB Thione to Glut and THPS was examined.

A one gallon sample was separated from a five gallon sample of frac pond water for these studies. The frac pond water sample included SRB and AB. Ten mL of a $10^9$ cfu/mL inoculum of SRB grown in anaerobic API broth containing an $O_2$ scavenger and 10 mL of a $10^9$ cfu/mL inoculum of AB grown in anaerobic phenol red (anPR) broth containing an $O_2$ scavenger were added to the one gallon frac pond water sample, mixed well and allowed to incubate for a period of time sufficient to achieve a desired number of SRB and AB. All broth media for inoculum and serial dilution counts in this study was made at 4% salinity to match the salinity of the original frac pond water measured by total dissolved solids testing. To increase nutrient value and to emulate on-site friction reducing additives, a 30 weight % acrylic acid, 70% acrylamide copolymer was added to the inoculated gallon of frac pond water sample at 300 ppm and then referred to as the spiked frac pond water sample. The spiked sample was then divided into 99.0 g aliquots for testing the effect of various biocides at various concentrations on the SRB and AB over a 180 day contact time. One spiked aliquot would serve as the control sample to which no biocide would be added. Challenges were made to all aliquots using 0.5 mL of $10^8$ SRB and 0.5 mL, of $10^8$ AB at 14, 28, and 129 days contact time.

The biocides included a 20% water based Thione (WB Thione), a 24% caustic based Thione (CB Thione), a 25% Glut, and a 35% THPS. Stock biocide solutions of various concentrations were made from these biocides as described below.

The WB Thione stock solutions were prepared by adding 3.0 g of the biocide to 17.0 g of sterile distilled water to form an intermediate solution, followed by combining each intermediate solution with water in the accounts shown in Table 1 below to make the descending concentrations as shown in Table 1.

TABLE 1

| Stock Solution Sample | WB Thione Concentration (ppm) | Intermediate Solution (g) | Water Added (g) | Total Amount (g) |
|---|---|---|---|---|
| AA | 25000 | 1.67 | 8.33 | 10.00 |
| AB | 50000 | 3.33 | 6.67 | 10.00 |
| AC | 100000 | 6.67 | 3.33 | 10.00 |
| AD | 150000 | 20.00 | 0.00 | 20.00 |

The CB Thione stock solutions were prepared by adding 3.0 g of the biocide to 17.0 g of sterile distilled water to form an intermediate solution, followed by combining each intermediate solution with water in the amounts shown in Table 2 below to make the descending concentrations as shown in Table 2.

TABLE 2

| Stock Solution Sample | CB Thione Concentration (ppm) | Intermediate Solution (g) | Water Added (g) | Total Amount (g) |
|---|---|---|---|---|
| BA | 25000 | 1.67 | 8.33 | 10.00 |
| BB | 50000 | 3.33 | 6.67 | 10.00 |
| BC | 100000 | 6.67 | 3.33 | 10.00 |
| BD | 150000 | 20.00 | 0.00 | 20.00 |

The Glut stock solutions were prepared by adding 1.0 g biocide to 19.0 g of sterile distilled water to form an intermediate solution, followed by combining each intermediate solution with water in the amounts shown in Table 3 below to make the descending concentrations as shown in Table 3.

TABLE 3

| Stock Solution Sample | Glut Concentration (ppm) | Intermediate Solution (g) | Water Added (g) | Total Amount (g) |
|---|---|---|---|---|
| CA | 5000 | 1.00 | 9.00 | 10.00 |
| CB | 10000 | 2.00 | 8.00 | 10.00 |
| CC | 20000 | 4.00 | 6.00 | 10.00 |
| CD | 50000 | 20.00 | 0.00 | 20.00 |

The THPS stock solutions were prepared by adding 1.0 g of the biocide to 19.0 g of sterile distilled water to form an intermediate solution, followed by combining each intermediate solution with water in the amounts shown in Table 4 below to make the descending concentrations as shown in Table 4.

TABLE 4

| Stock Solution Sample | THPS Concentration (ppm) | Intermediate Solution (g) | Water Added (g) | Total Amount (g) |
|---|---|---|---|---|
| DA | 5000 | 1.00 | 9.00 | 10.00 |
| DB | 10000 | 2.00 | 8.00 | 10.00 |
| DC | 20000 | 4.00 | 6.00 | 10.00 |
| DD | 50000 | 20.00 | 0.00 | 20.00 |

Next, 1 g of each biocide stock solution was added to the appropriately labeled 99.0 g aliquot. Also, 1.0 g of sterile water was added to the control aliquot. The concentrations of the biocides present in each aliquot are provided below in Table 5.

TABLE 5

| Control (ppm) | WB Thione Concentration (ppm) | | CB Thione Concentration (ppm) | | Glut Concentration (ppm) | | THPS Concentration (ppm) | |
|---|---|---|---|---|---|---|---|---|
| 0 | AA | 250 | BA | 250 | CA | 50 | DA | 50 |
|   | AB | 500 | BB | 500 | CB | 100 | DB | 100 |
|   | AC | 1000 | BC | 1000 | CC | 200 | DC | 200 |
|   | AD | 1500 | BD | 1500 | CD | 500 | DD | 500 |

The aliquots were then incubated at room temperature in the dark for the entire study, i.e., 6 months. During the 6 month period, each aliquot was tested to determine the log quantity of SRB and AB in each aliquot at each of the following contact times: 7 days, 14 days, 21 days, 28 days, 35 days, 42 days, 56 days, 90 days, 136 days, and 180 days. Using sterile syringes, this testing was performed by serial diluting the aliquots into sealed 9.0 mL anaerobic API broth and anaerobic PR broth bottles, both media containing an $O_2$ scavenger, in the appropriate labeled set of SRB bottles (6 for each aliquot) mid AB bottles (6 for each aliquot) until a color change occurred, indicating the log quantity of organisms present in each aliquot. The control sample was serial diluted in 9 media bottles for a possible $10^9$ count. The SRB bottles that did not undergo a color change were examined for 21 days, and the AB bottles that did not undergo a color change were examined for 14 days. As shown in Tables 6-9 below, at 180 days contact time, the control contained >$10^9$ cfu/mL of both types of bacteria, whereas the aliquots treated with WB Thione and CB Thione biocides contained no or low levels of SRBs or ABs in most cases and maintained that control through three substantial challenges with native organisms. However, the aliquots treated with Glut lost all control of SRB and AB after the $2^{nd}$ challenge on day 28 and the aliquots treated with THPS depending on treatment concentration, lost all control of SRB and AB from 1 to 21 days contact time particularly after the $1^{st}$ challenge on day 14. Thus, the Thione proved to be much more effective at inhibiting SRB and AB growth in frac water than the Glut and THPS treatments.

Acid producing bacterial counts (AB) in the control increased one log value from $10^8$ to >$10^9$ over the course of the 180-day study. Two versions of Thione chemistries were tested against THPS and Glut with excellent comparable results using the WB Thione and the CB Thione. Both short term and especially long term control were exceptional with the Thione chemistries in comparison with industry standards of Glut and THPS. Control was also maintained with all concentrations of the Thione chemistries through three substantial challenges with the exception of 250 ppm CB Thione which failed after the third challenge at 129 days as compared with treatment at all levels of Glut and THPS which failed with early challenges. In particular, treatment with four levels of THPS failed after challenging once at 14 days contact time and with all concentrations of Glut after challenging twice at 14 and 28 days contact time. All testing, stopped when failure to control AB occurred.

Sulfate Reducing bacterial counts (SRB) in the control decreased from $10^9$ to $10^8$ over the 180-day course of the study. As above with AB, both formulations of Thione chemistries provided exceptional control over both the short and long term for SRB through 3 substantial challenges at all concentrations tested except the 250 ppm treatment of CB Thione which lost control after the third challenge on day 129. Comparatively, THPS failed completely after challenging once at 14 days contact time at all concentrations and Glut failed completely at all concentrations after challenging twice at 14 and 28 days contact time. All testing stopped when failure to control SRB occurred.

TABLE 6

| Bioc. Conc. in ppm "as is" | Log 10 Anaerobic Sulfate Reducing Bacteria/mL* | | | | | | | | | |
|---|---|---|---|---|---|---|---|---|---|---|
|  | 7 Days | 14 Days | 21 Days | 28 Days | 35 Days | 42 Days | 66 Days | 90 Days | 136 Days | 180 Days |
| 0 ppm (Control) | ≧9 | 6 | 14 DAY CHALLENGE | ≧9 | ≧9 | 28 DAY CHALLENGE | ≧9 | ≧9 | ≧9 | ≧9 | 129 DAY CHALLENGE | ≧9 | ≧9 |
| WB Thione |  |  |  |  |  |  |  |  |  |  |
| 250 ppm (AA) | 0 | 1 | AT $10^8$ | 0 | 0 | AT $10^9$ | 0 | 0 | 0 | 0 | AT $10^9$ | 1 | 0 |
| 500 ppm (AB) | 0 | 0 |  | 0 | 0 |  | 0 | 0 | 0 | 0 |  | 0 | 0 |
| 1000 ppm (AC) | 0 | 0 |  | 0 | 0 |  | 0 | 0 | 0 | 0 |  | 0 | 0 |
| 1500 ppm (AD) | 0 | 0 |  | 0 | 0 |  | 0 | 0 | 0 | 0 |  | 0 | 0 |
| CB Thione |  |  |  |  |  |  |  |  |  |  |
| 250 ppm (BA) | 1 | 1 |  | 0 | 0 |  | 0 | 0 | 0 | 0 |  | ≧3 | ≧3 |
| 500 ppm (BB) | 0 | 0 |  | 0 | 0 |  | 0 | 0 | 0 | 0 |  | 1 | 0 |

TABLE 6-continued

| Bioc. Conc. in ppm "as is" | Log 10 Anaerobic Sulfate Reducing Bacteria/mL* | | | | | | | | | |
|---|---|---|---|---|---|---|---|---|---|---|
| | 7 Days | 14 Days | 21 Days | 28 Days | 35 Days | 42 Days | 66 Days | 90 Days | 136 Days | 180 Days |
| 1000 ppm (BC) | 0 | 0 | 0 | 0 | 0 | 0 | 0 | 0 | 0 | 0 |
| 1500 ppm (BD) | 0 | 0 | 0 | 0 | 0 | 0 | 0 | 0 | 0 | 0 |

TABLE 7

| Bioc. Conc. in ppm "as is" | Log 10 Anaerobic Sulfate Reducing Bacteria/mL* | | | | | | | | | | | |
|---|---|---|---|---|---|---|---|---|---|---|---|---|
| | 7 Days | 14 Days | 14 | 21 Days | 28 Days | 28 | 35 Days | 42 Days | 58 Days | 90 Days | 136 Days | 180 Days |
| Glut | | | | | | | | | | | | |
| 50 ppm (CA) | 0 | 0 | 14 DAY CHALLENGE AT $10^8$ | 0 | 0 | 28 DAY CHALLENGE AT $10^5$ | ≧3 | ≧6 | ≧6 | ≧5 | DISCONTINUED | |
| 100 ppm (CB) | 0 | 0 | | 0 | 0 | | ≧3 | ≧6 | ≧5 | ≧5 | DISCONTINUED | |
| 200 ppm (CC) | 0 | 0 | | 0 | 0 | | ≧3 | ≧6 | ≧6 | ≧6 | DISCONTINUED | |
| 500 ppm (CD) | 0 | 0 | | 0 | 0 | | ≧3 | 5 | ≧6 | ≧6 | DISCONTINUED | |
| THPS | | | | | | | | | | | | |
| 60 ppm (DA) | ≧6 | ≧6 | | ≧5 | ≧6 | | ≧6 | ≧6 | ≧6 | ≧6 | DISCONTINUED | |
| 100 ppm (DB) | 5 | 5 | | ≧5 | ≧6 | | ≧6 | ≧6 | ≧6 | ≧6 | DISCONTINUED | |
| 200 ppm (DC) | 0 | 0 | | ≧6 | ≧6 | | ≧6 | ≧6 | ≧6 | ≧6 | DISCONTINUED | |
| 500 ppm (DD) | 0 | 0 | | 4 | 3 | | 3 | ≧6 | ≧6 | ≧6 | DISCONTINUED | |

*Six serial dilution bottles were used for each treated sample and 9 bottles for the untreated control.

TABLE 8

| Bioc. Conc. in ppm "as is" | Log 10 Anaerobic Acid Producing Bacteria/mL* | | | | | | | | | | | |
|---|---|---|---|---|---|---|---|---|---|---|---|---|
| | 7 Days | 14 Days | 21 Days | 28 Days | 35 Days | 42 Days | 56 Days | 90 Days | | 136 Days | 180 Days | |
| 0 ppm (Control) WB Thione | 8 | 6 | 14 DAY CHALLENGE AT $10^5$ | ≧9 | ≧9 | 28 DAY CHALLENGE AT $10^8$ | ≧9 | ≧9 | ≧9 | ≧9 | 129 DAY CHALLENGE AT $10^6$ | ≧9 | ≧9 |
| 250 ppm (AA) | 2 | 1 | | 1 | 1 | | 1 | 0 | 1 | 0 | | 2 | 1 |
| 500 ppm (AB) | 1 | 1 | | 0 | 0 | | 0 | 0 | 0 | 0 | | 0 | 0 |
| 1000 ppm (AC) | 0 | 0 | | 0 | 0 | | 0 | 0 | 0 | 0 | | 0 | 0 |
| 1500 ppm (AD) | 0 | 0 | | 0 | 0 | | 0 | 0 | 0 | 0 | | 0 | 0 |
| CB Thione | | | | | | | | | | | | | |
| 250 ppm (BA) | 1 | 1 | | 1 | 1 | | 1 | 1 | 1 | 1 | | ≧3* | ≧3* |
| 500 ppm (BB) | 1 | 1 | | 1 | 1 | | 1 | 0 | 0 | 0 | | 1 | 0 |
| 1000 ppm (BC) | 1 | 0 | | 1 | 0 | | 1 | 1 | 1 | 0 | | 1 | 0 |
| 1500 ppm (BD) | 0 | 0 | | 0 | 1 | | 0 | 0 | 0 | 0 | | 0 | 0 |

*Dilutions were made to $10^2$ poly

TABLE 9

| Bioc. Conc. in ppm "as is" | Log 10 Anaerobic Acid Producing Bacteria/mL* | | | | | | | | | | | |
|---|---|---|---|---|---|---|---|---|---|---|---|---|
| | 7 Days | 14 Days | 14 | 21 Days | 28 Days | 28 | 35 Days | 42 Days | 58 Days | 90 Days | 136 Days | 180 Days |
| Glut | | | | | | | | | | | | |
| 50 ppm (CA) | 0 | 0 | DAY CHALLENGE AT $10^5$ | 1 | 0 | DAY CHALLENGE AT $10^8$ | $\geq 3$ | $\geq 6$ | $\geq 6$ | $\geq 5$ | DISCONTINUED | |
| 100 ppm (CB) | 0 | 0 | | 0 | 0 | | $\geq 3$ | $\geq 6$ | $\geq 6$ | $\geq 6$ | DISCONTINUED | |
| 200 ppm (CC) | 0 | 1 | | 0 | 0 | | $\geq 3$ | $\geq 5$ | $\geq 6$ | $\geq 6$ | DISCONTINUED | |
| 500 ppm (CD) | 0 | 0 | | 0 | 0 | | $\geq 3$ | 4 | $\geq 6$ | $\geq 6$ | DISCONTINUED | |
| THPS | | | | | | | | | | | | |
| 50 ppm (DA) | 5 | $\geq 6$ | | $\geq 6$ | $\geq 6$ | | $\geq 6$ | $\geq 6$ | $\geq 6$ | $\geq 6$ | DISCONTINUED | |
| 100 ppm (DB) | 5 | 5 | | $\geq 6$ | $\geq 6$ | | $\geq 6$ | $\geq 6$ | $\geq 6$ | $\geq 5$ | DISCONTINUED | |
| 200 ppm (DC) | 1 | 0 | | $\geq 6$ | $\geq 6$ | | $\geq 6$ | $\geq 6$ | $\geq 6$ | $\geq 6$ | DISCONTINUED | |
| 500 ppm (DD) | 0 | 0 | | 4 | 3 | | 4 | 3 | $\geq 6$ | $\geq 6$ | DISCONTINUED | |

*Six serial dilution bottles were used for each treated sample and 9 bottles for the untreated control.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A production well injection composition, comprising:
    an injection fluid for removing a production fluid from a subterranean formation; and
    a biocide comprising 3,5-dimethyl-1,3,5-thiadiazinane-2-thione in an amount effective to inhibit bacterial growth.

2. The production well injection composition of claim 1, wherein the injection fluid comprises an aqueous fluid.

3. The production well injection composition of claim 1, wherein the injection fluid comprises fresh water or salt water.

4. The production well injection composition of claim 1, wherein the production fluid is oil and the injection fluid is at least partially miscible with the oil.

\* \* \* \* \*

(12) EX PARTE REEXAMINATION CERTIFICATE (10155th)
United States Patent
Starkey, II et al.

(10) Number: US 7,786,054 C1
(45) Certificate Issued: May 9, 2014

(54) BIOCIDE FOR WELL STIMULATION AND TREATMENT FLUIDS

(75) Inventors: Ronald Joe Starkey, II, Canton, GA (US); Geoffrey Allen Monteith, Midland, GA (US); Carl Wilhelm Aften, Marietta, GA (US)

(73) Assignee: Kemira Chemicals Inc., Kennesaw, GA (US)

Reexamination Request:
No. 90/011,471, Feb. 2, 2011

Reexamination Certificate for:
Patent No.: 7,786,054
Issued: Aug. 31, 2010
Appl. No.: 11/779,509
Filed: Jul. 18, 2007

Related U.S. Application Data

(63) Continuation-in-part of application No. 11/497,724, filed on Aug. 2, 2006, now Pat. No. 7,906,463.

(51) Int. Cl.
| | | |
|---|---|---|
| *E21B 43/00* | (2006.01) | |
| *C09K 8/68* | (2006.01) | |
| *E21B 33/00* | (2006.01) | |
| *C04B 28/02* | (2006.01) | |
| *C09K 8/58* | (2006.01) | |
| *C09K 8/42* | (2006.01) | |
| *C04B 40/00* | (2006.01) | |
| *C04B 24/12* | (2006.01) | |
| *C09K 8/88* | (2006.01) | |
| *C09K 8/60* | (2006.01) | |
| *C09K 8/467* | (2006.01) | |
| *C04B 103/67* | (2006.01) | |
| *C04B 103/30* | (2006.01) | |
| *C04B 24/16* | (2006.01) | |

(52) U.S. Cl.
CPC . *C04B 28/02* (2013.01); *C09K 8/68* (2013.01); *C09K 8/58* (2013.01); *C09K 8/428* (2013.01); *C04B 40/0028* (2013.01); *C04B 24/128* (2013.01); *C04B 2103/67* (2013.01); *C04B 2103/34* (2013.01); *C09K 8/88* (2013.01); *C09K 8/605* (2013.01); *C09K 8/467* (2013.01); *C04B 24/16* (2013.01)
USPC ............ 507/256; 166/266; 166/285; 507/211

(58) Field of Classification Search
None
See application file for complete search history.

(56) References Cited

To view the complete listing of prior art documents cited during the proceeding for Reexamination Control Number 90/011,471, please refer to the USPTO's public Patent Application Information Retrieval (PAIR) system under the Display References tab.

*Primary Examiner* — Krisanne Jastrzab

(57) ABSTRACT

A well stimulation and or treatment fluid that includes water, other additives, and a biocide consisting of 3,5-dimethyl-1,3,5-thiadiazinane-2-thione in an amount effective to inhibit bacterial growth and minimize antagonistic reactions between the biocide and other additives. Also disclosed are well injection compositions, stimulations, squeezing, waterflood, packing, cement compositions, and methods for cementing.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4 are cancelled.

\* \* \* \* \*